(12) United States Patent
Murata et al.

(10) Patent No.: US 8,568,890 B2
(45) Date of Patent: Oct. 29, 2013

(54) WATCH COVER GLASS

(75) Inventors: Yasushi Murata, Sakado (JP);
Koutarou Takazaki, Sayama (JP)

(73) Assignee: Citizen Holdings Co., Ltd., Tokyo (JP)

( * ) Notice: Subject to any disclaimer, the term of this patent is extended or adjusted under 35 U.S.C. 154(b) by 875 days.

(21) Appl. No.: 12/680,132

(22) PCT Filed: Sep. 25, 2008

(86) PCT No.: PCT/JP2008/067335
§ 371 (c)(1),
(2), (4) Date: Mar. 25, 2010

(87) PCT Pub. No.: WO2009/041528
PCT Pub. Date: Apr. 2, 2009

(65) Prior Publication Data
US 2010/0196685 A1    Aug. 5, 2010

(30) Foreign Application Priority Data
Sep. 26, 2007 (JP) .................. 2007-249259

(51) Int. Cl.
*B32B 17/06* (2006.01)
*C23C 14/38* (2006.01)

(52) U.S. Cl.
USPC ........... 428/428; 428/432; 428/688; 428/689; 428/699; 428/701; 428/702; 428/704; 204/192.1; 204/192.15; 204/192.16; 204/192.23

(58) Field of Classification Search
USPC ......... 428/432, 701, 702, 704, 428, 688, 689, 428/699; 204/192.1, 192.15, 192.16, 204/192.23
See application file for complete search history.

(56) References Cited

U.S. PATENT DOCUMENTS

2010/0027383 A1*    2/2010    Suzuki et al. .................. 368/276

FOREIGN PATENT DOCUMENTS

| JP | 2002-202401 A |   | 7/2002 |
| JP | 2004-198354 A |   | 7/2004 |
| JP | 2004-271480   | * | 9/2004 |
| JP | 2004-271480 A |   | 9/2004 |
| JP | 2005-114649   | * | 4/2005 |
| JP | 2005-114649 A |   | 4/2005 |
| JP | 2005-274527 A |   | 10/2005 |

OTHER PUBLICATIONS

JP 2005-114649 Yoshino translation.*
JP-2004-271480 Yoshino translation.*
Belkind et al. "Characterization of pulsed dc magnetron sputtering plasmas", published 2005.*

* cited by examiner

*Primary Examiner* — David Sample
*Assistant Examiner* — Lauren Colgan
(74) *Attorney, Agent, or Firm* — Sughrue Mion, PLLC

(57) ABSTRACT

A watch cover glass having high hardness and excellent abrasion, and also having flaw resistance and antireflection function even after being used for a long period of time. The watch cover glass comprises a transparent substrate and, provided on at least one surface of the substrate, an antireflection film having a lamination structure that a SiON film ($SiO_2$ and $Si_3N_4$ mixed film) and a $Si_3N_4$ film are laminated and the outermost layer is the SiON film. Accordingly, the proper antireflection effect can be obtained, the hardness of the antireflection film is increased and the abrasion resistance is remarkably increased. As a result, even after being used for a long period of time, the surface of the antireflection film is not finely flawed and is not peeled off, and it hardly occurs that the hands or dial plate are invisible due to surface mist and the antireflection function can be maintained.

19 Claims, 10 Drawing Sheets

(a)

(b)

(a)

(b)

WATCH COVER GLASS

FIELD OF THE INVENTION

The present invention relates to a watch cover glass and particularly, relates to a watch cover glass capable of maintaining antireflection function for a long period of time and having flaw resistance.

TECHNICAL BACKGROUND

For watch cover glasses, blue plate glass (soda glass), white plate glass, sapphire glass and the like are used. These cover glasses have a high reflectance in the visible light region and have problems on visibility for watch hands and dials. That is to say, when we check time by a watch under various environments, for example, indoor, outdoor, day or night, there is a problem such that it is difficult for us to look the time indication of the watch because outdoor daylight or illumination changes and thereby the surface of a cover glass of the watch reflects these lights.

In order to solve the above problems, it is well known that the both surfaces or at least one surface are coated with an antireflection film (for example, referred to Patent document 1).

Antireflection films are generally prepared by making and combining an oxide film, a nitride film, a fluoride film or a sulfide film of a metal or an inorganic substance having an appropriate refractive index into a film having a desired reflectance in a limited wavelength region.

However, the antireflection film disclosed in Patent document 1 has inferior flaw resistance etc. Patent document 1 discloses a wristwatch equipped with a cover glass, which is coated with an antireflection film having an outermost layer of magnesium fluoride. When the wristwatch is used for a long period of time, it has problems such that the surface of the antireflection film is minutely flawed or peeled off, and thereby the surface is fogged and the watch hands or dials are hardly visible. Furthermore, even if $SiO_2$ having a film hardness higher than that of magnesium fluoride is used, the above problems cannot be solved.

Patent document 2 is known as a conventional technique of solving the above problems disclosed in Patent document 1.

Patent document 2 discloses the technique that the film hardness is improved by adding a slight amount of nitrogen to a $SiO_2$ material constituting an antireflection film provided on a cover glass.

In the antireflection film disclosed in Patent document 2, there is still room for improvement on effective hardness and flaw resistance.

Patent document 1: JP-A-2002-202401 (p. 2, FIG. 1 and FIG. 2)

Patent document 2: JP-A-2005-114649 (pp. 3 and 4, FIG. 1)

DISCLOSURE OF THE INVENTION

Subject to be Solved by the Invention

It is an object of the present invention to solve the above problems and to provide a watch cover glass having a high hardness and excellent abrasion resistance, and also even if using for a long period of time, having flaw resistance and antireflection function.

Means for Solving the Subject

In order to attain the above object, the watch cover glass of the present invention has the following structure.

The watch cover glass of the present invention comprises a transparent substrate having a front surface and a back surface and, on at least one surface of the substrate, an antireflection film in which a $SiO_2$ and $Si_3N_4$ mixed film (in the present specification sometimes referred to as SiON film or mixed film) and a $Si_3N_4$ film are laminated alternately one after another in the total of 4 layers or 5 or more layers and the outermost layer is the $SiO_2$ and $Si_3N_4$ mixed film.

The antireflection film is preferably obtainable by laminating the mixed film and the $Si_3N_4$ film in this order alternately one after another from the substrate toward the outermost layer, or laminating the $Si_3N_4$ film and the mixed film in this order alternately one after another from the substrate toward the outermost layer.

The mixed film has a nitrogen content based on the total of oxygen and nitrogen of preferably 5 to 90 atom %.

In the antireflection film, the number of the layers laminated alternately is preferably 4 to 12 layers.

The mixed film has a thickness of preferably 0.01 to 1.0 μm and the $Si_3N_4$ film has a thickness of preferably 0.01 to 1.2 μm.

The antireflection film has a thickness of preferably 0.1 to 4.0 μm.

The antireflection film is preferably laminated on both of the front surface and the back surface of the substrate.

The antireflection film is preferably formed by a reactive sputtering method.

The process for producing a watch cover glass according to the present invention is a process for producing a watch cover glass comprising a transparent substrate having a front surface and a back surface and, provided on at least one surface, an antireflection film, which process comprises an antireflection film-forming step of forming the antireflection film in such a way that a $SiO_2$ and $Si_3N_4$ mixed film and a $Si_3N_4$ film are laminated alternately one after another in the total of 4 layers or 5 or more layers by a reactive sputtering method and the outermost layer is the $SiO_2$ and $Si_3N_4$ mixed film.

The antireflection film is preferably obtainable by laminating the mixed film and the $Si_3N_4$ film in this order alternately one after another from the substrate toward the outermost layer, or laminating the $Si_3N_4$ film and the mixed film in this order alternately one after another from the substrate toward the outermost layer.

The reactive sputtering method is preferably conducted using a Si target as a raw material in the presence of a mixed gas at least containing a nitrogen-containing gas and an inert gas by a DC pulse discharge.

The mixed film has a nitrogen content based on the total of oxygen and nitrogen of preferably 5 to 90 atom %.

In the antireflection film, the number of the layers laminated alternately is preferably 4 to 12 layers.

The mixed film has a thickness of preferably 0.01 to 1.0 μm and the $Si_3N_4$ film has a thickness of preferably 0.01 to 1.2 μm.

The antireflection film has a thickness of preferably 0.1 to 4.0 μm.

The antireflection film is preferably laminated on both of the front surface and the back surface of the substrate.

The watch of the present invention has the above watch cover glass.

(Function)

The present inventors have been studied on antireflection films in watch cover glasses. As a result, a watch cover glass having abrasion resistance, and having, even if being used for a long period of time, flaw resistance and antireflection function can be prepared by providing an antireflection film comprising a laminated film of a SiON film and $Si_3N_4$ film on at least one surface of a transparent substrate having a front surface and a back surface, which antireflection film has a SiON film as an outermost layer. The front surface of the watch cover glass is a surface, which is exposed in the air. The reactive sputtering method that $SiO_2$ and $Si_3N_4$ are formed using Si as a target only by exchange of a reaction gas is suitable for forming the SiON film, and a method of introducing a gas containing N (for example $N_2$) together with $O_2$ gas and Ar gas in the film formation is preferable. The SiON film thus formed is in a $SiO_2$ and $Si_3N_4$ mixed state and has a large internal stress. The abrasion resistance and hardness of the film are improved. As described above, the SiON film having a property such that light absorption hardly occurs in the inside of the film, and also having a high hardness and excellent abrasion resistance can be formed.

According to the analysis by the present inventors, the N content in the film, which improves the film hardness of the SiON film, has been confirmed by XRD (X ray diffraction) and XPS analysis (X ray photoelectron spectroscopic analysis). In the film forming, the flow ratio of the reactive gas and the N content ratio ((oxygen+nitrogen):nitrogen) in the SiON film are almost same. When the flow rate (volume ratio) of oxygen to nitrogen is 100:11, the atomic ratio of oxygen to nitrogen in the film is 60:6 (nitrogen 9 atm %). When the flow rate (volume ratio) of oxygen to nitrogen is 100:41, the atomic ratio of oxygen to nitrogen in the film is 36:23 (nitrogen 33 atm %). The refractive index of the SiON film formed is increased in accordance with increasing the value of the reactive gas flow rate ratio $N_2/(N_2+O_2)$ in the film formation. When the flow rate ratio is 5% by volume, there is almost no change from the value 1.47 of the refractive index of the $SiO_2$ film. When the flow rate ratio is 11% by volume, the refractive index is 1.52. When the flow rate ratio is 41% by volume, the refractive index is 1.64. It is found that when the flow rate ratio is over 90% by volume, the refractive index reaches about 2.0, which is the refractive index of $SiN_4$.

The O1s and N1s orbital photoelectron spectrums of the SiON film determined by XPS according to the present invention are shown in FIG. 6. As is clear from the figure, the SiON film of the present invention is not a film obtainable by only incorporating a nitrogen atom into $SiO_2$, it is confirmed that the SiOn film is a mixed film in a $SiO_2$ and $Si_3N_4$ mixed state.

Such film hardening is not occurred by introducing a $N_2$-containing gas using $SiO_2$ as a sputtering target in the formation of the SiON film and it is confirmed that it is a phenomenon peculiar to the reactive sputtering using the Si target. This is considered that the plasma space and the film surface to be deposited are more activated by the sputtering using the Si target as compared with the sputtering using the $SiO_2$ target and thereby the reaction is accelerated. Furthermore, the film-forming rate is significantly fast by using the Si target because the DC mode can be used and the improvement of the productivity is desired.

As described above, the SiON film and the $Si_3N_4$ film each have a high hardness and excellent abrasion resistance, so that they can prepare a watch cover glass having transparency and antireflection function.

Patent document 2 discloses that even if nitrogen is contained in the $SiO_2$ film, the refractive index is not changed. Furthermore, the fact that the refractive index is scarcely changed is confirmed by the results of tracing examinations. There is still room for improving the hardness and flaw resistance.

Effect of the Invention

As described above, since the watch cover glass of the present invention has the antireflection film comprising the laminated film of the SiON film and the $Si_3N_4$ film provided on at least one surface of the transparent substrate having a front surface and a back surface, the hardness of the antireflection film surface is increased and the abrasion resistance is improved. As a result, even if the watch formed with the antireflection film is used for a long period of time, the antireflection film has no problems such that the surface of the antireflection film is flawed with fine scratches or peeled off, to be fogged and thereby the watch hands or the dials are hardly shown, and therefore, the antireflection function can be maintained. Moreover, according to the present invention, the antireflection function is not deteriorated so that the decorative properties of the dials are not marred by variation with time. Furthermore, when a solar battery is mounted on dials, an electromotive force is generated for moving a watch by receiving light passed through a cover glass, the antireflection function of the watch of the present invention is not deteriorated and thereby the power generation efficiency of the solar battery can be maintained at a high level.

BRIEF EXPLANATION OF THE DRAWING

FIG. 10-1 is a view showing the XPS analysis results on the SiON material according to the present invention.

FIG. 10-2 is a view showing the XPS analysis results on the SiON material according to the present invention.

DESCRIPTION OF MARKS

Figure 1:
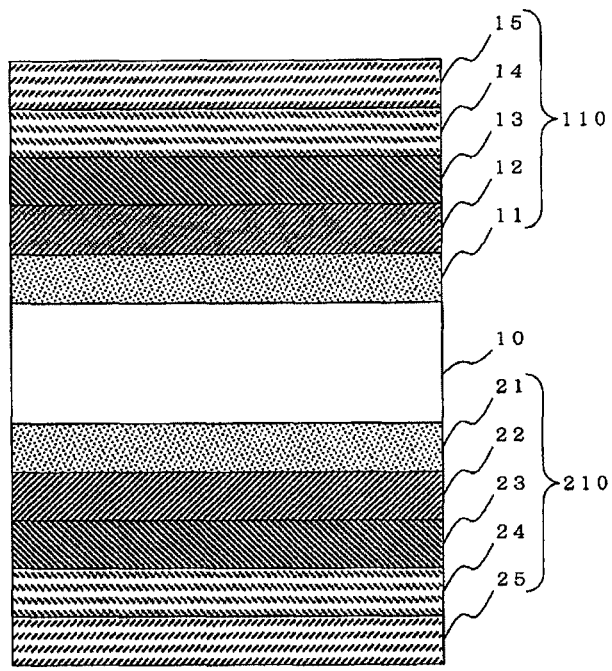
FIG. 1 is a cross sectional schematic view showing the structure of a watch cover glass in Example 1 of the present invention.

10 . . . Sapphire glass (Substrate)
11, 13, 15, 21, 23 and 25 . . . SiON film
12, 14, 22 and 24 . . . $Si_3N_4$ film
110 and 210 . . . Antireflection film
30 . . . Si target
31 . . . Vacuum chamber
32 . . . Gas introducing port
34 . . . DC electric source

BEST EMBODIMENT FOR CARRYING OUT THE INVENTION

The embodiment of the present invention will be described below with reference to the drawings.

<Watch Cover Glass>

Figure 2:
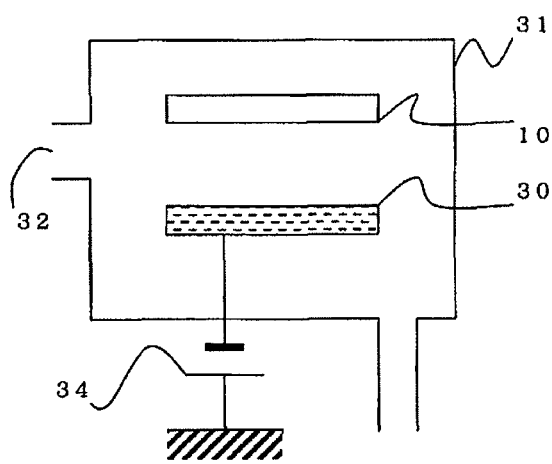
FIG. 2 is a schematic view of a sputtering apparatus for laminating an antireflection film.

FIG. 1 is a cross sectional schematic view showing one example of the structure of a watch cover glass according to the present invention. On the front surface and the back surface of a sapphire glass 10 as a transparent substrate, antireflection films 110, 210 formed by lamination of SiON and $Si_3N_4$ are laminated. FIG. 2 is a cross sectional schematic view of a sputtering apparatus for laminating the antireflection film. The antireflection film is formed by a DC reactive sputtering method in the present invention. Si is used as a target and sputtering is carried out by introducing an inert gas such as Ar, He or Ne, $O_2$ gas and $N_2$ gas from a gas introducing port 32, and applying a direct current voltage in a pulse state on the Si target to laminate the film on the sapphire glass 10. In this time, the Si target may be doped with a slight amount of boron or phosphorus may be used in order to give conductivity on the Si target and to carry out sputtering stably and submitted to use. The film prepared by the sputtering method of using the Si target is a SiON film or a $Si_3N_4$ film. These films can be formed by exchanging and mixing reactive $O_2$ gas and $N_2$ gas.

The properties of the antireflection film depend on the layer number of films to be laminated, the order of films to be disposed and the refractive index and the film thickness of each layered film, and the reflectance and the transmittance spectrum along the specifications are calculated and designed to optimize the properties. Furthermore, the refractive index of the SiON film can be varied by the film-forming conditions.

As the very suitable properties of a watch cover glass, the reflectance in the visible light region that the wavelength is 400 nm to 700 nm is about not more than 5%. When the transparent substrate is sapphire glass, this demand can be usually realized by forming the antireflection film on the front surface and the back surface of the substrate.

As described above, the watch cover glass of the present invention is characterized by comprising the transparent substrate having the front surface and the back surface, and on at least one surface of the substrate, the antireflection film having a structure such that the $SiO_2$ and $Si_3N_4$ mixed film and the $Si_3N_4$ film are laminated alternately one after another in the total of 4 layers or 5 or more layers, preferably 4 to 12 layers and the outermost layer is the $SiO_2$ and $Si_3N_4$ mixed film. The watch cover glass is prepared by a production process including an antireflection film-forming step of forming the antireflection film with, for example, a reactive sputtering method. The watch cover glass of the present invention will be described in more detail below.

Embodiment 1

The watch cover glass according to the embodiment 1 of the present invention comprises a transparent substrate having the front surface and the back surface and antireflection films laminated on both of the front and back surfaces of the substrate.

(Transparent Substrate)

Examples of the substrate are blue plate glass (soda glass), white plate glass, synthetic quartz, sapphire glass and transparent plastics. Examples of the transparent plastics are polycarbonate, methyl methacrylate resin, polystyrene and polyethylene terephthalate.

The substrate has a thickness of usually 200 to 4000 μm.

In the present specification, the front surface of the substrate is a surface exposed to the air in using the watch cover glass of the embodiment 1 to a watch, and the back surface thereof is a surface faced to dials in using the watch cover glass of the embodiment 1 to the watch.

(Antireflection Film)

The antireflection film used in the embodiment 1 has a structure such that the mixed film and the $Si_3N_4$ film are laminated alternately one after another in this order from the substrate toward the outermost layer in the total of 5 layers, and the outermost layer is the mixed film. That is to say, as shown in FIG. 1, the antireflection films laminated on the front surface and the back surface have a structure of consisting of a mixed film 11 (21)/a $Si_3N_4$ film 12 (22)/a mixed film 13 (23)/a $Si_3N_4$ film 14 (24)/a mixed film 15 (25) from the substrate side. Furthermore, the antireflection film formed on the front surface may be formed by laminating the mixed film and the $Si_3N_4$ film in the total of 7 layers, 9 layers or 11 layers. When the number of lamination is larger than the above number of lamination, the lamination takes a long period of time and, the film sometimes is easily peeled by the internal stress of the film. The layer number of the antireflection film formed on the back surface is similar to the antireflection film formed on the front surface, the antireflection film formed on the front surface and that of the back surface may have the same layer number or different ones. In any of the cases, the outermost layer is the mixed film.

The alternately multi-layered antireflection film can exhibit the antireflection function and maintain the transparency. The antireflection film having the above layer number can have excellent antireflection function and hardness. Furthermore, when the outermost layer is the mixed film, it is possible to prepare a watch cover glass having excellent abrasion resistance, weathering resistance (resistances to light, heat moisture, etc.) and good antireflection function. (When the outermost layer is the $Si_3N_4$ film, the reflection of light at the boundary face of $Si_3N_4$/air is increased and thereby the antireflection effect is lowered. On this account, the mixed film having a refractive index lower than that of $Si_3N_4$ and capable of largely giving the overall antireflection effect is provided on the outermost layer.) That is to say, when the antireflection layer has a structure such that from the substrate toward the outermost layer, the mixed film and $Si_3N_4$ film are laminated alternately one after another in this order in the above total of the layers laminated, and the outermost layer is the mixed film, it can have higher hardness and more excellent abrasion resistance and also excellent weathering resistance.

The mixed film is a film in which $SiO_2$ and $Si_3N_4$ are mixed. This is confirmed by XPS analysis. Specifically, it is confirmed that there are separately a peak of Si—O bond (O-1s orbit) derived from $SiO_2$ and a peak of Si—N bond (N-1s orbit) derived from $Si_3N_4$ by the measurement and the analysis in the conditions in the examples as described later.

In the mixed film, based on the total of oxygen and nitrogen, the nitrogen content is usually 5 to 90 atom %, preferably 10 to 80 atom %, and the oxygen content is usually 95 to 10 atom %, preferably 90 to 20 atom %. When the nitrogen and oxygen contents are in the above ranges, the mixed film having a refractive index different from those of $SiO_2$ and $Si_3N_4$, a high hardness and excellent abrasion resistance is prepared. The above content is determined by XPS analysis as described later.

The mixed film has a thickness of usually 0.01 to 1.0 μm, preferably 0.02 to 0.8 μm. The $Si_3N_4$ film has a thickness of usually 0.01 to 1.2 μm, preferably 0.02 to 0.8 μm. When the mixed film has a thickness in the above range, the antireflection film can exhibit a function as a low refractive index layer and has an enhanced hardness and enhanced abrasion resistance. When the $Si_3N_4$ film has a thickness in the above range, the antireflection film can exhibit a function as a high refractive index layer, and has an enhanced hardness and enhanced abrasion resistance.

The antireflection film has a thickness of usually 0.1 to 4.0 µm, preferably 0.3 to 2.0 µm. The overall antireflection film has a thickness lower than the above lower limit, the abrasion resistance and flaw resistance are sometimes lowered. On the other hand, the antireflection film has a thickness more than the above upper limit, it is sometimes easily peeled off by the internal stress of the film or the productivity thereof is sometimes lowered.

The film thickness is measured by the stylus type surface roughness tester (sometimes referred to as surface roughness measuring apparatus) as described later.

The mixed film has a refractive index of usually 1.52 to 1.96, and the $Si_3N_4$ film has a refractive index of usually 2.00 to 2.04. On this account, they are laminated alternately one after another in a proper thickness so that the antireflection function can be exhibited and also the transparency can be maintained. The refractive index is measured by Ellipsometer as described later.

(Watch Cover Glass)

The watch cover glass having the above antireflection film has a reflectance to light in the visible light region, namely a wavelength of 380 to 780 nm of usually 0.1 to 25%, preferably 0.1 to 15%. Furthermore, the average reflectance is usually 0.8 to 4.0%, preferably 0.8 to 3.0%. Using the antireflection film having the above structure, excellent antireflection function can be exhibited. The reflectance and the average reflectance are determined by spectral reflection measurement in a combination of a visible region spectrophotometer and an integrating sphere as described later.

The watch cover glass (front surface side) has a micro Vickers hardness of usually 1000 to 2500, preferably 1200 to 1800. In the abrasion resistance evaluation test (front surface side) described in the examples, the watch cover glass is usually evaluated to be acceptable. As described above, using the antireflection film having the above structure, the hardness and abrasion resistance are enhanced.

Moreover, in the sunshine weathering test and the pressure cooker test as described in the examples, the antireflection function is not deteriorated, and the watch cover glass having the antireflection film has excellent weathering resistance. Specifically, the increase of the average reflectance in the sunshine weathering test or the pressure cooker test is controlled in the range of usually 0 to 0.4%.

(Production Process)

The watch cover glass according to the embodiment 1 is produced, for example, with a reactive sputtering method by a production process comprising an antireflection film-forming step of forming the above antireflection film. In order to control the nitrogen content in the mixed film, the step is preferably carried out at least in the presence of a mixed gas of $N_2$ gas and an inert gas by applying a direct current voltage in a pulse state toward a target (DC pulse discharging type sputtering method). In the case of the DS sputtering method with no DC pulse discharging type, it is sometimes difficult to control the nitrogen content.

Specifically, the sputtering apparatus as described in FIG. 2 is used. At first, inside of a vacuum chamber 31 of the apparatus, a substrate 10 and a Si target 30 are placed. In this case, they are placed so that the front surface of the substrate 10 is opposite to the Si target 30.

Next, after exhausting by a vacuum pump, $O_2$ gas, $N_2$ gas and an inert gas are introduced from a gas introducing port 32. Examples of the inert gas are Ar, He and Ne gases.

Subsequently, sputtering is carried out in the presence of a mixed gas of $O_2$ gas, $N_2$ gas and the inert gas using a DC electric source 34 by applying a direct current voltage in a pulse state to the Si target. In this way, a mixed film was formed on the substrate 10. The flow ratio of $O_2$ gas and $N_2$ gas ($O_2$ gas:$N_2$ gas (volume ratio)) is usually 90:10 to 10:90. In the formation, the nitrogen content in the mixed film can be controlled in the above range by appropriately varying the flow ratio in the above range. Furthermore, the thickness of the mixed film can be controlled in the above range by appropriately varying the plasma electric power and the film-forming time. It is preferred that before carrying out the lamination film-forming, the relation among plasma electric power, the film-forming time and the mixed film thickness be understood by carrying the film-forming test on a monolayer of the mixed film, and then the lamination film-forming be carried out.

Subsequently, the mixed gas of $O_2$ gas, $N_2$ gas and the inert gas is changed to a mixed gas of $N_2$ gas and the inert gas. In the presence of this mixed gas, sputtering is carried out by applying a direct current voltage in a pulse state on the Si target to form a $Si_3N_4$ film on the substrate laminated with the mixed film. In the sputtering, the thickness of the $Si_3N_4$ film can be regulated by appropriately varying the plasma electric power and the film-forming time. It is preferred that before carrying out the lamination film-forming, the relation among plasma electric power, the film-forming time and the $Si_3N_4$ film thickness be understood by carrying the film-forming test on a monolayer of the $Si_3N_4$ film, and then the lamination film-forming be carried out.

Next, the mixed gas (reactive gas) is appropriately changed and the mixed film and the $Si_3N_4$ film are formed repeatedly in the same manner as described above. In this way, the mixed film and the $Si_3N_4$ film are formed in this order alternately one after another from the substrate 10 toward the outermost layer to laminate 5 layers and consequently an antireflection film 110 having the mixed film in the outermost layer can be formed. The resulting antireflection film 110 has a thickness of preferably 0.1 to 4.0 µm.

On the back surface of the substrate 10, an antireflection film 210 is formed in the same manner as described above.

In the above step, the Si target may be doped with a slight amount of boron or phosphorus and then used in order to give conductivity to the Si target and carry out the sputtering stably. Furthermore, a nitrogen-containing gas such as $NH_3$ etc. can be used in place of $N_2$ gas, and further, it is preferred to use $N_2$ gas as impurities such as H group, NH group, etc. are not contained. In the antireflection films 110, 210, the mixed film and the $Si_3N_4$ are laminated in this order alternately one after another to form 7 layers, 9 layers or 11 layers. Moreover, the antireflection film 210 may be formed prior to the antireflection film 110.

According to the above production process, the watch cover glass having the above properties is prepared.

Embodiment 2

The watch cover glass according to the embodiment 2 of the present invention comprises a transparent substrate having the front surface and the back surface, and antireflection films formed on each of the front surface and the back surface of the substrate.

(Transparent Substrate)

The substrate used in the embodiment 2 of the present invention is the same as described in the embodiment 1.

(Antireflection Film)

The antireflection film used in the embodiment 2 is prepared in such a way that a $Si_3N_4$ film and a mixed film are laminated in this order alternately one after another from the substrate toward the outermost layer to form 4 layers which outermost layer is the mixed film. That is to say, the antireflection films formed on the front surface and the back surface each have a structure of $Si_3N_4$ film/mixed film/$Si_3N_4$ film/mixed film from the substrate side. The antireflection film formed on the front surface comprises the mixed films and the $Si_3N_4$ films laminated in the total of 6 layers, 8 layers, 10 layers or 12 layers. When the lamination layer number is larger than the above, the lamination takes a longer time and also the film is sometimes easily peeled off by the internal stress of the film. The layer number of the antireflection film formed on the back surface is similar to that of the antireflection film formed on the front surface. The lamination layer number on the front surface may be the same as or different from the lamination layer number on the back surface. Both of the outermost layer on the front surface and that on the back surface are mixed films.

The antireflection function can be exhibited and maintain transparency by the alternate lamination, and excellent antireflection function and hardness can be obtained by the lamination in the above lamination layer number. Moreover, when the outermost layer is the mixed film, the watch cover glass having excellent abrasion resistance and weathering resistance, and having good antireflection function can be prepared (when the outermost layer is the $Si_3N_4$ film, the reflection of light is increased at the boundary face of $Si_3N_4$/air, and thereby the antireflection effect is lowered. On this account, the mixed film having a lower refractive index than that of $Si_3N_4$ and capable of largely getting the overall antireflection effect is laminated on the outermost layer). That is to say, the antireflection layer has a structure such that the $Si_3N_4$ film and the mixed film are laminated from the substrate toward the outermost layer in this order alternately one after another in the total of the above layers and the outermost layer is the mixed film. As a result, the antireflection layer has a higher hardness and abrasion resistance and also can exhibit excellent weathering resistance.

The meaning of the mixed film, the nitrogen content in the mixed film, the thickness of the mixed film, the thickness of the $Si_3N_4$ film, the thickness of the antireflection film, the refractive index of the mixed film and the refractive index of the $Si_3N_4$ film are the same as those in the embodiment 1.

(Watch Cover Glass)

The watch cover glass having the above antireflection film has a reflectance to light in the visible light region, namely light in a wavelength of 380 to 780 mm of usually 0.1 to 25%, preferably 0.1 to 15%. The average reflectance is usually 0.8 to 4.0%, preferably 0.8 to 3.0%. As described above, using the antireflection film having the above structure, the watch cover glass can exhibit excellent antireflection function.

The watch cover glass (front surface side) has a micro Vickers hardness of usually 1000 to 2500, preferably 1200 to 1800. In the abrasion resistance evaluation test (front surface side) described in the examples, the watch cover glass is usually evaluated to be acceptable. As described above, using the antireflection film having the above structure, the hardness and abrasion resistance are enhanced.

Moreover, in the sunshine weathering test and the pressure cooker test as described in the examples, the antireflection function is not deteriorated, and the watch cover glass having the antireflection film has excellent weathering resistance. Specifically, the increase of the average reflectance in the sunshine weathering test or the pressure cooker test is controlled in the range of usually 0 to 0.4%.

When the embodiments 1 and 2 are compared, the embodiment 1 is more excellent on the design of the antireflection properties. The embodiment 1 has more excellent balance between reflective strength and reflective color as compared with the embodiment 2, and has a merit of easily decreasing (relaxing) the visual dependency of reflective color (phenomenon that the color of reflective light changes by a view angle).

(Production Process)

The watch cover glass according to the embodiment 2 is produced, for example, with a reactive sputtering method by a production process comprising an antireflection film-forming step of forming the antireflection film. In order to control the nitrogen content in the mixed film, the step is preferably carried out in the presence of at least a mixed gas of $N_2$ gas and an inert gas by applying a direct current voltage in a pulse state to a target (DC pulse discharging type sputtering method) in the same manner as described in the embodiment 1.

The watch cover glass of the embodiment 2 is prepared in the same procedure as that of the embodiment 1 except that the order of the mixed film and Si3N4 film and the layer number are different. The watch cover glass thus prepared has the above properties.

Embodiment 3

The watch cover glass according to the embodiment 3 of the present invention comprises a transparent substrate having the front surface and the back surface, and an antireflection film formed on the back surface of the substrate.

(Transparent Substrate)

The substrate used in the embodiment 3 of the present invention is the same as described in the embodiment 1.

(Antireflection Film)

Figure 8:
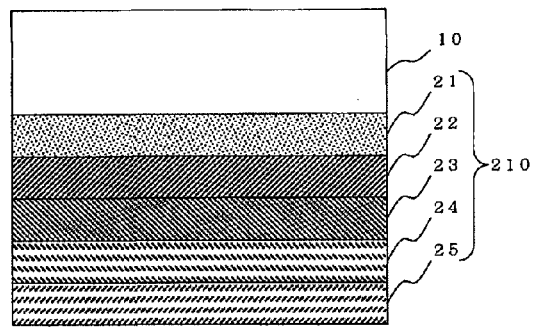
FIG. 8 is a cross sectional schematic view showing the structure of a watch cover glass in Example 2 of the present invention.

The antireflection film used in the embodiment 3 is prepared in such a way that a mixed film and a $Si_3N_4$ film are laminated in this order alternately one after another from the substrate toward the outermost layer to form 5 layers which outermost layer is the mixed film. That is to say, as shown in FIG. 8, the antireflection film formed on the back surface has a structure of mixed film 21/$Si_3N_4$ film 22/mixed film 23/$Si_3N_4$ film 24/mixed film 25 from the substrate side. The antireflection film formed on the back surface comprises the mixed film and the $Si_3N_4$ films in the total of 7 layers, 9 layers or 11 layers. When the lamination layer number is larger than the above, the lamination takes a longer time and also the film is sometimes easily peeled off by the internal stress of the film. In any cases, the outermost layer is the mixed film.

The antireflection film can exhibit antireflection function and maintain transparency by the alternate lamination. From the viewpoint of the antireflection function, the antireflection film preferably has the above number of laminated films. When the antireflection film is provided on only the back surface and the substrate has more excellent hardness and abrasion resistance than those of the antireflection film, there is a merit such that the higher hardness and abrasion resistance can be maintained. When high antireflection function is not required, the embodiment 3 that the antireflection film is provided on only the back surface is preferred because the cost is depressed. Moreover, if the antireflection film has a structure such that the mixed film and the $Si_3N_4$ film are laminated in this order alternately one after another in the above layer number from the substrate toward the outermost layer, and the outermost layer is the mixed layer, it can exhibit excellent weathering resistance (resistances to light, heat, moisture and the like).

The meaning of the mixed film, the nitrogen content in the mixed film, the thickness of the mixed film, the thickness of the $Si_3N_4$ film, the thickness of the antireflection film, the refractive index of the mixed film and the refractive index of the $Si_3N_4$ film are the same as those in the embodiment 1.

(Watch Cover Glass)

The watch cover glass having the above antireflection film on only the back surface has a reflectance toward light in the visible light region, namely light in a wave length of 380 to 780 mm of usually 6.8 to 32%, preferably 6.8 to 25%. The average reflectance is usually 7.1 to 11.0%, preferably 7.1 to 10.0%. As described above, using the antireflection film having the above structure, the watch cover glass can exhibit excellent antireflection function.

The micro Vickers hardness and the abrasion resistance evaluation test of the above watch cover glass depend on the properties of the substrate. That is to say, when the substrate has more excellent hardness and abrasion resistance than those of the antireflection film, the higher hardness and abrasion resistance can be maintained.

Moreover, in the sunshine weathering test and the pressure cooker test as described in the examples, the antireflection function is not deteriorated, and the watch cover glass having the antireflection film has excellent weathering resistance. Specifically, the increase of the average reflectance in the sunshine weathering test or the pressure cooker test is controlled in the range of usually 0 to 0.2%.

(Production Process)

The watch cover glass according to the embodiment 3 is produced, for example, with a reactive sputtering method by a production process comprising an antireflection film-forming step of forming the antireflection film. In order to control the nitrogen content in the mixed film, the step is preferably carried out in the presence of at least a mixed gas of $N_2$ gas and an inert gas by applying a direct current voltage in a pulse state toward a target (DC pulse discharging type sputtering method) in the same manner as described in the embodiment 1.

The watch cover glass of the embodiment 3 is prepared in the same procedure as that of the embodiment 1 except that the antireflection film is provided on only the back surface. The watch cover glass thus prepared has the above properties.

Embodiment 4

The watch cover glass according to the embodiment 4 of the present invention comprises a transparent substrate having the front surface and the back surface, and an antireflection film laminated on the back surface of the substrate.

(Transparent Substrate)

The substrate used in the embodiment 4 of the present invention is the described as in the embodiment 1.

The antireflection film used in the embodiment 4 has a structure such that a $Si_3N_4$ film and a mixed film are laminated in this order alternately one after another from the substrate toward the outermost layer to form 4 layers which outermost layer is the mixed film. That is to say, the antireflection film formed on the back surface has a structure of $Si_3N_4$ film/ mixed film/$Si_3N_4$ film/mixed film from the substrate side. The antireflection film formed on the back surface may comprise the mixed films and the $Si_3N_4$ films laminated in the total of 6 layers, 8 layers, 10 layers or 12 layers. When the lamination layer number is larger than the above, the lamination takes a longer time and also the film is sometimes easily peeled off by the internal stress of the film. In any cases, the outermost layer is the mixed film.

The antireflection film can exhibit antireflection function and maintain transparency by the alternate lamination. From the viewpoint of the antireflection function, the antireflection film preferably has the above number of laminated films. When the antireflection film is provided on only the back surface and the substrate has more excellent hardness and abrasion resistance than those of the antireflection film, there is a merit such that the higher hardness and abrasion resistance can be maintained. When high antireflection function is not required, the embodiment 4 that the antireflection film is provided on only the back surface is preferred because the cost is depressed. Moreover, if the antireflection film has a structure such that the $Si_3N_4$ film and the mixed film are laminated in this order alternately one after another in the above layer number from the substrate toward the outermost layer, and the outermost layer is the mixed layer, it can exhibit excellent weathering resistance (resistances to light, heat, moisture and the like).

The meaning of the mixed film, the nitrogen content in the mixed film, the thickness of the mixed film, the thickness of the $Si_3N_4$ film, the thickness of the antireflection film, the refractive index of the mixed film and the refractive index of the $Si_3N_4$ film are the same as those in the embodiment 1.

(Watch Cover Glass)

The watch cover glass having the above antireflection film formed on only the back surface has a reflectance toward light in the visible light region, namely light in a wave length of 380 to 780 mm of usually 6.8 to 32%, preferably 6.8 to 25%. The average reflectance is usually 7.2 to 11.0%, preferably 7.2 to 10.0%. As described above, using the antireflection film having the above structure, the watch cover glass can exhibit excellent antireflection function.

The micro Vickers hardness and the abrasion resistance evaluation test of the above watch cover glass depend on the properties of the substrate. That is to say, when the substrate has more excellent hardness and abrasion resistance than those of the antireflection film, the high hardness and abrasion resistance can be maintained.

Moreover, in the sunshine weathering test and the pressure cooker test as described in the example, the antireflection function is not deteriorated, and the watch cover glass having the antireflection film also has excellent weathering resistance. Specifically, the increase of the average reflectance in the sunshine weathering test or the pressure cooker test is controlled in the range of usually 0 to 0.2%.

(Production Process)

The watch cover glass according to the embodiment 4 is produced, for example, with a reactive sputtering method by a production process comprising an antireflection film-forming step of forming the antireflection film. In order to control the nitrogen content in the mixed film, the step is preferably carried out in the presence of at least a mixed gas of $N_2$ gas and an inert gas by applying a direct current voltage in a pulse state toward a target (DC pulse discharging type sputtering method) in the same manner as described in the embodiment 1.

The watch cover glass of the embodiment 4 is prepared in the same procedure as in the embodiment 2 except that the antireflection film is provided on only the back surface. The watch cover glass thus prepared has the above properties.

Other Embodiments

In the embodiment 1, the antireflection films formed on the front surface or the back surface may be changed to the antireflection film used in the embodiment 2.

In the embodiment 3, the antireflection film is provided on only the back surface, but it may be provided on only the front surface. Similarly, in the embodiment 4, the antireflection film is provided on only the back surface, but it may be provided on only the front surface.

The watch of the present invention is characterized by having the above watch cover glass. The watch may be any one of a photoelectric driven watch, a thermoelectric driven watch, a standard time electric wave-receiving type self-correcting watch, a mechanical watch and general electronic watches. Such watches are produced using the above watch cover glasses by a known method.

EXAMPLE

The examples of the present invention are described with reference to FIG. 1 to FIG. 3 below.

Example 1

The watch cover glass in the present example had an antireflection film 110 formed on the front surface of a sapphire glass 10 and an antireflection film 210 formed on the back surface thereof as shown in FIG. 1. The film structure of the antireflection film 110 was the same structure as that of the antireflection film 210. In the example, using SiON having a ratio of nitrogen to (oxygen+nitrogen) in the film of 33 atom %, $Si_3N_4$, and SiON having a ratio of nitrogen to (oxygen+nitrogen) in the film of 9 atom %, SiON (nitrogen 33 atom %), $Si_3N_4$, SiON (nitrogen 33 atom %), $Si_3N_4$ and SiON (nitrogen 9 atom %) were laminated in this order on the sapphire glass. (The measuring method for the nitrogen content is described later.) The film thicknesses of the layers were 145 nm, 155 nm, 20 nm, 100 nm and 80 nm in this laminated order. (The measuring method is described later.) Furthermore, the $Si_3N_4$ film had a refractive index of 2.00. The refractive index of the SiON film can be finely regulated according to the sputtering conditions. The refractive index of SiON (nitrogen 33 atom %) was 1.67, and the refractive index of SiON (nitrogen 9 atom %) was 1.52. The refractive index was determined by measuring to light in a wavelength of 550 nm with Ellipsometer. (The measuring method is described later.) $Si_3N_4$ and SiON do not have complete stoichiometric compositions, but these minute differences are caused regularly as far as the film is formed by a vacuum film formation method. These minute differences are no consideration.

(Nitrogen Content in the Mixed Film)

The method of measuring the nitrogen content in the film is described. In the measuring method for the nitrogen content in each layer, at first, a monolayer film of the film was formed on a substrate by prescribed sputtering electric power in a prescribed gas flow ratio. The XPS measurement on the monolayer film is carried out to determine the nitrogen content in the film. In a watch cover glass laminated with all the layers, as a film formed by the same film-forming conditions (a specific gas flow ratio and a specific sputtering time) in the above monolayer film will have the same nitrogen content as that of the monolayer film, this content measuring method was used. The nitrogen content of each layer in the multi-layered lamination was measured in this way.

(Film Thickness)

The method of measuring the film thickness is described. In the method of measuring the film thickness of each layer, at first, formation of a monolayer film of the film on a substrate was carried out by a prescribed sputtering film-forming time in a prescribed gas flow ratio to prepare a film with a mask. Next, bumps of the mask part in the monolayer film are measured by a stylus type surface roughness tester (Tencor Co., Ltd. Model P-11). It has turned out empirically that when the DC introducing electric powder in sputtering is the same and the gas flow ratio in film-forming and the sputtering film-forming time are constant, the generating rate (depositing rate on a substrate) of a compound layer is about constant at all time. Thus, this film thickness measuring method is used. The film thickness of each layer in the multilayered lamination was determined by converting from the film thickness of each monolayer film thus measured and the film-forming time in the multilayered lamination.

(Refractive Index)

The method of measuring the refractive index is described. In the measuring method for the refractive index of each layer, at first, the film thickness of a monolayer film of the film formed on a Si wafer substrate was measured in the same manner as the above film thickness measurement. The refractive index of the monolayer film was calculated by multi-wavelength measurement for the sample using Ellipsometer (manufactured by Horiba, Ltd.). When the monolayer thickness has been known, the calculation method of the refraction index with Ellipsometer is known so that the explanation of the method is abbreviated. This operation was carried out for many samples, and thereby the refractive indexes of the mixed film and $Si_3N_4$ film were measured. This measuring procedure is a usual method in the refractive index measurement for isotropic transparent optical material thin films. The refractive index data of various monolayer films thus measured applied to the refractive index of each layer in the multi-layer lamination.

The conceptive view of a DC reactive sputtering apparatus in the process for producing the antireflection film of the example is shown in FIG. 2.

In a vacuum bath 31, a Si target 30 was disposed and direct current voltage was applied on the Si target 30. A sapphire glass 10 was placed to face toward the Si target 30. The Si target 30 was connected with a DC electric source 34.

By a vacuum pump not shown, the inside of the vacuum bath 31 was exhausted until the residual gas pressure was about $7 \times 10^{-4}$ Pa and a mixed gas of Ar, $O_2$ and $N_2$ or a mixed gas of Ar and $N_2$ was introduced from a gas introducing port 32 and then the antireflection film 110 was laminated by carrying out a DC reactive sputtering in the following conditions. The formations of SiON and $Si_3N_4$ films were performed by changing the gas kind and the gas flow ratio. The film-forming conditions of each layer are shown below. The distance between the target and the substrate in the film forming was 60 mm. In order to enhance the reactivity of the reactive sputtering, pulse voltage application having a duty of 1:1 was employed in the DC voltage application.

(1) First layer (SiON film 11, 21) from the sapphire glass surface

Ar flow rate: 20 sccm (the flow rate at 1 atm and 25° C.)
$N_2$ flow rate: 11.5 sccm
$O_2$ flow rate: 8 sccm
DC output: 2500 W
Gas pressure in sputtering: 1.6 E-1 Pa (2) Second layer ($Si_3N_4$ film 12, 22) from the sapphire glass surface Ar flow rate: 30 sccm
$N_2$ flow rate: 33 sccm
DC output: 3500 W
Gas pressure in sputtering: 2.1 E-1 Pa (3) Third layer (SiON film 13, 23) from the sapphire glass surface Ar flow rate: 20 sccm
$N_2$ flow rate: 11.5 sccm O₂ flow rate: 8 sccm
DC output: 2500 W
Gas pressure in sputtering: 1.6 E-1 Pa
(4) Fourth layer (Si₃N₄ film 14, 24) from the sapphire glass surface
Ar flow rate: 30 sccm
N₂ flow rate: 33 sccm
DC output: 3500 W
Gas pressure in sputtering: 2.1 E-1 Pa
(5) Fifth layer (Outermost film) (SiON film 15, 25) from the sapphire glass surface
Ar flow rate: 20 sccm
O₂ flow rate: 16.2 sccm
N₂ flow rate: 2 sccm
DC output: 2500 W
Gas pressure in sputtering: 1.6 E-1 Pa As described above, the antireflection film 110 was formed on the front surface of the sapphire glass 10. Thereafter, the sapphire glass 10 was reversed, the back surface of the sapphire glass 10 was subjected to the same procedure for the front surface and thereby the antireflection film 210 was laminated. The antireflection film 210 on the back surface and the antireflection film 110 on the front surface were formed in the same film-forming conditions and had the same film structure.

In the above way, a watch cover glass with the antireflection films having SiON and Si₃N₄ laminated films on the front surface and the back surface on the sapphire glass 10 as described in FIG. 1 was completed.

[Antireflection Function]

Figure 3:
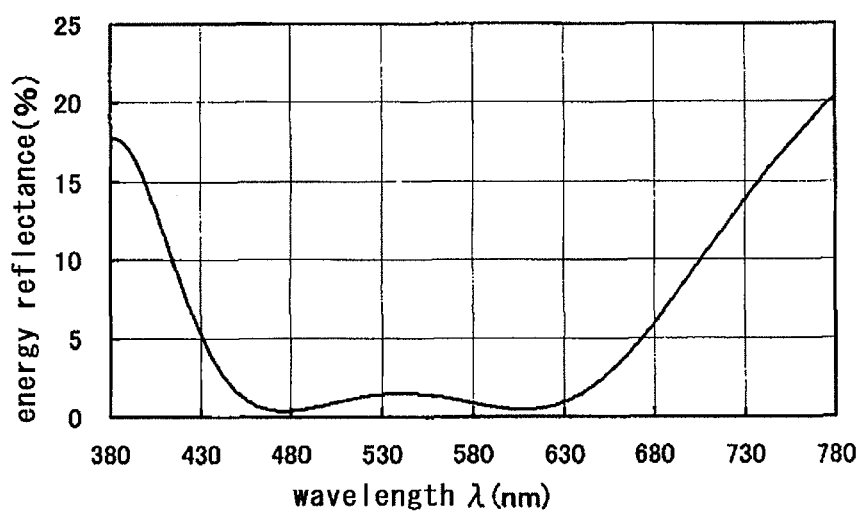
FIG. 3 is a spectrum view of a reflectance property of the watch cover glass in Example 1 of the present invention.

The results of measuring the spectral reflection properties of the finished cover glass are shown in FIG. 3. The reflectance in the visible light region with respect to a wavelength of 380 to 780 nm was low, and particularly, the reflectance in a high visibility with respect to a wavelength of 450 nm to 650 nm was not more than 2%. The cover glass had no dusky appearance caused by light absorption of the antireflection film. When the cover glass was set in a watch, the dial visibility was very excellent. It was confirmed that the very excellent antireflection effect can be obtained as compared with a sapphire glass no provided with an antireflection film which glass has a reflectance in overall visible light wavelength regions of about 13%.

In Example 1, the average reflectance of the watch cover glass was 1.6% and the average reflectance of the monolayer sapphire glass was 13.1%. The reflectance and average reflectance were determined in the following procedure.

(Reflectance and Average Reflectance)

The reflectance of the watch cover glass was measured in the following procedure.

At first, in a spectrophotometer (Model: U-3300 manufactured by Hitachi, Ltd.) in which any object for measurement was not set in both of the reference measurement optical side and the sample measurement optical side, 100% permeation calibration was carried out in the overall wave length measuring band. Successively, the monolayer sapphire glass 10 as a transparent substrate (formed without an antireflection film) was set vertically toward the light axis of the sample measurement optical system in the spectrophotometer. Any object for measurement was not set in the reference optical side and transmittance measurement was carried out in this state in the measuring wave length band, and thereby the spectral transmittance (spectral energy transmittance) of the monolayer sapphire glass 10 (formed without an antireflection film) to the air was obtained. Since the monolayer sapphire glass 10 has no visible light absorption properties, the spectral reflectance of the monolayer sapphire glass 10 was obtained by subtracting the resulting spectral transmittance from 1.0 (100%). In this manner, the precise spectral reflectance regarding the monolayer sapphire glass 10 was measured.

In one optical system of the spectrophotometer, an integrating sphere was set and a wedge shaped sample hold jig having a vertical angle of 10° with a 20⌀ aperture was installed. The jig was used in order that in the measurement, the reflected light from the sample can be bound by the inside of the integrating sphere without leaking into the incident light side. In the wedge shaped sample hold jig for measurement thus prepared, a standard white plate (barium sulfate white plate) recommended by CIE is installed, light having wave lengths in the visible light band was irradiated, and the intensity of the reflected light was measured in each wave length and the value was recorded as 100% reflectance. Practically, the data was memorized in the memory of a computer. Successively, the monolayer sapphire glass 10 (formed without an antireflection film) was installed in the wedge shaped sample hold jig and a rough surface-having black plate was installed in the surface opposite to the measurement light incident side. The rough surface-having black plate was installed in order that the influence of the reflected light from the surface of the sample hold jig was removed. In this condition, light in wavelengths of the visible light band was irradiated, the intensity of reflected light was measured in each wavelength and the reflectance of the sapphire glass 10 was obtained at the time that the reflectance of the standard white plate in each wavelength was 100%. In this case, the reflectance of the sapphire glass 10 in one wavelength was calculated by dividing the intensity of reflected light of the sapphire glass 10 in the wavelength by the intensity of reflected light of the standard white plate in the wavelength. The reflectance of the sapphire glass 10 determined by the calculation was different from the accurate spectral reflectance in the above monolayer sapphire glass 10 because the value determined by the calculation was based on 100% of the reflectance of the standard white plate. The reflectance of the sapphire glass 10 was slightly higher than the accurate spectral reflectance.

In order to obtain the accurate spectral reflectance in the measuring system using the integrating sphere, it was necessary to multiply the calculated value of the spectral reflectance in each wavelength by the correction value. The correction value was determined by dividing the accurate reflectance of the sapphire glass in each wavelength by the calculated value of the reflectance of the sapphire glass in each wavelength.

Successively, the reflectance of the sample formed with the antireflection film was measured. The measurement was carried out in such a way that an integrating sphere was set on one optical system of a spectrophotometer, and a wedge shaped sample hold jig having a vertical angle of 10° with an aperture of a prescribed diameter (for example 20 mm⌀) was installed on the position where the measuring sample was to be set. The summary of the measurement was as described above. The spectral reflection of the cover glass formed with the antireflection film was determined by multiplying the reflectance data obtained by the measurement by the above correction value.

The average reflectance in the present specification is a value without weighing determined by taking an average of spectral reflectance of each wave length obtained in the above methods, particularly in the visible light range (450 nm to 650 nm) with high visibility.

[Formation of Mixed Film]

Figures 1, 10:
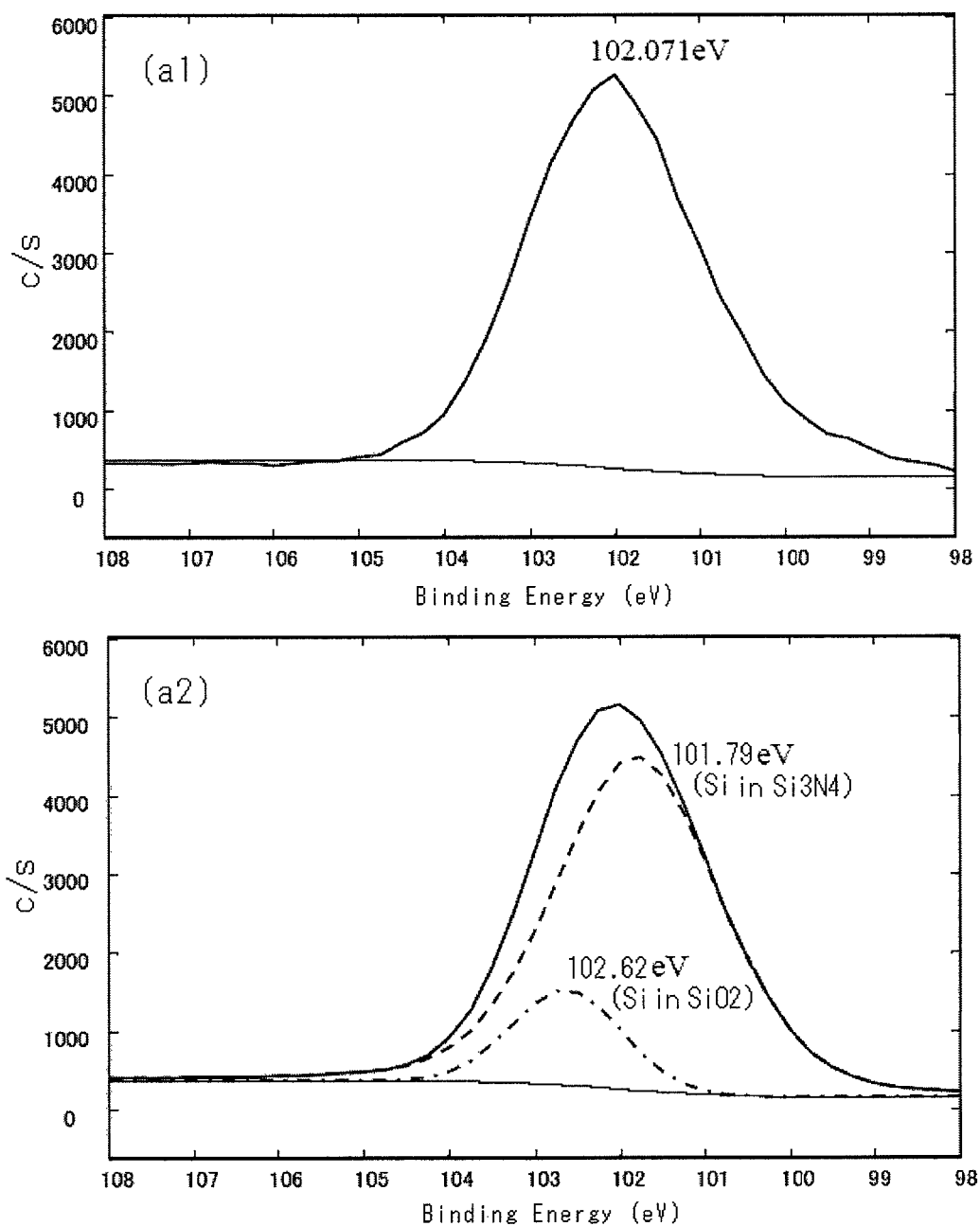
Figures 2, 10:
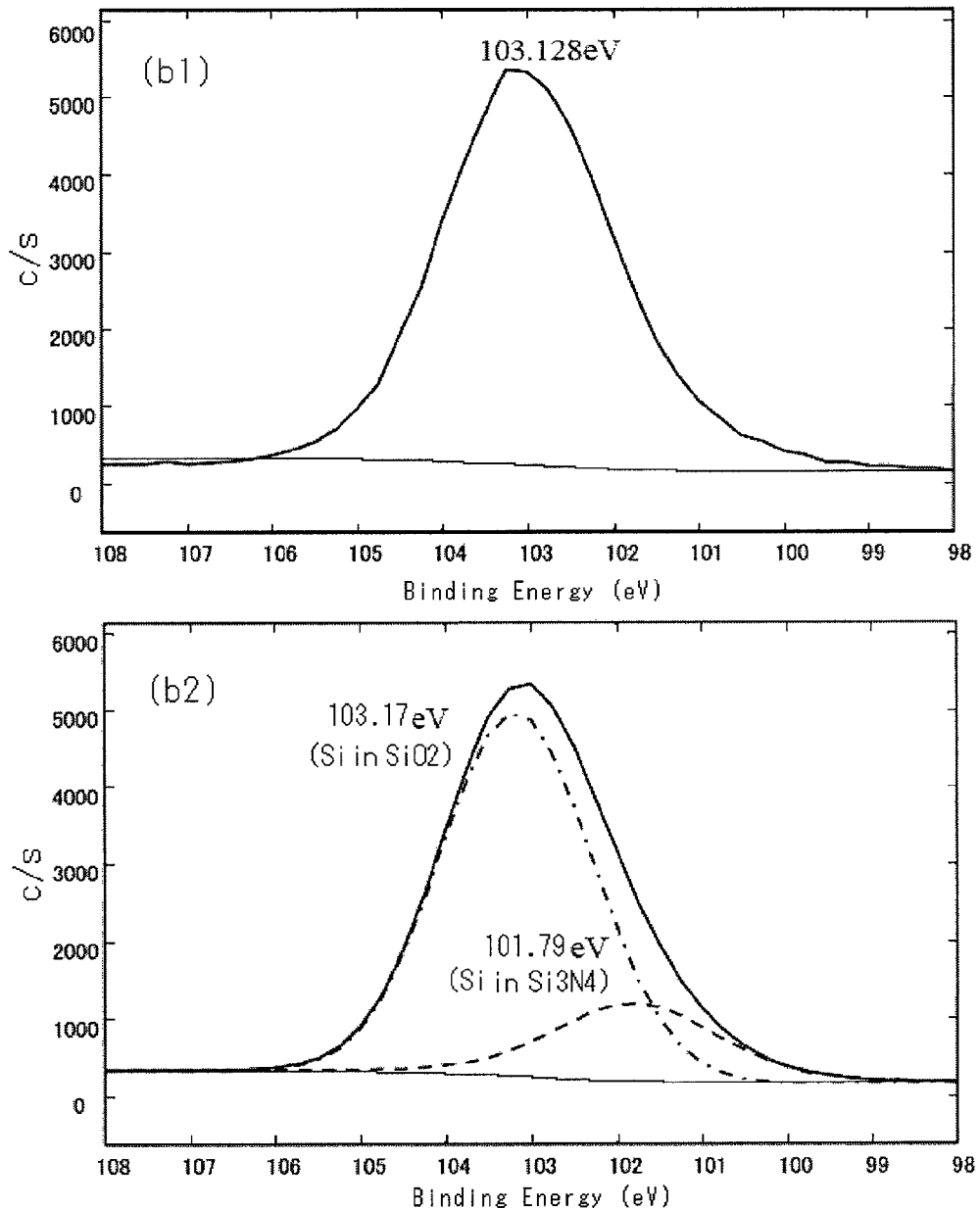

A sample prepared by laminating a film on a substrate 10 in the forming conditions of the first layer was subjected to XPS analysis. The results are shown in FIG. 10-1 (a1). When peak separation was carried out, the peak was separated to a peak of Si—O bond (O1s orbit) derived from $SiO_2$ and a peak of Si—N bond (N1s orbit) derived from $Si_3N_4$ (FIG. 10-1 (a2)). With respect to a sample prepared by laminating directly a film on a substrate 10 in the forming conditions of the fifth layer (FIG. 10-2 (b1), through peak separation, the peak was separated to a peak of Si—O bond (O1s orbit) derived from $SiO_2$ and a peak of Si—N bond (N1s orbit) derived from $Si_3N_4$ (FIG. 10-2 (b2)). As described above, reactive sputtering was carried out using a Si target as a raw material in the presence of a Ar, $O_2$ and $N_2$ mixed gas by a DC pulse discharge method and thereby a mixed film was formed. In the antireflection film laminated with from the first to fifth layers in Example 1, it is considered that the first layer, the third layer and the fifth layer are mixed films. The XPS analysis and the peak separation were carried out in the following ways.

(XPS Analysis and Peak Separation)

XPS is an analysis technique that quantitative analysis and bonding conditions of elements constituting a sample are analyzed by irradiating soft X rays on the sample and measuring photoelectrons emitted from the sample. In the present sample, the spectrums as shown in FIG. 10-1 (a1) and FIG. 10-2 (b1) are the experimental data of Si2p photoelectrons measured, and the spectrums as shown in FIG. 10-1 (a2) and FIG. 10-2 (b2) are the results of carrying out peak separation fitting simulation with $Si_3N_4$ (101.79 eV) and $SiO_2$ (103.12 eV) as a fitting parameter. The simulation results correspond to the experimental data extremely, and when the $N_2$ introducing flow ratio is increased, the peak derived from $Si_3N_4$ is clearly increased. Therefore, it is confirmed that the film of the sample has a mixed film structure such that $SiO_2$ and $Si_3N_4$ are mixed.

As described above, the spectrum (indicated by a solid line in FIG. 10-1 (a2) and FIG. 10-2 (b2)) obtained by addition of the separated peaks almost corresponded to the experimental spectrum of the sample. Accordingly, it is confirmed that the method of peak separation is appropriate.

Comparative Example 1

A cover glass was prepared by a conventionally known technique disclosed in Patent document 2 and was submitted to comparisons on surface hardness and other properties. Specifically, a cover glass was prepared by the procedure described in the example 1 of Patent document 2.

The watch cover glass in Patent document 2 had an average reflectance of 2.9%.

[Hardness]

The cover glass (the front surface side) in the preferable example of the present invention had a surface hardness, i.e. a micro Vickers hardness of not less than 1200. The cover glass (the front surface side) prepared by a conventional technique had a surface hardness, i.e. a micro Vickers hardness of not more than 850. The effect of improving the surface hardness in the present invention is evident. The micro Vickers hardness was determined in the following way.

(Micro Vickers Hardness)

In the micro Vickers hardness, an antireflection film formed on a Si wafer substrate was used as an object to be measured. The micro Vickers hardness was determined using a hardness measuring apparatus (H100VP-HCU manufactured by Fisher Instruments Co., Ltd.) from the depth of a dent and a hysteresis between indentation and indentation recovery in the following conditions.

Indenter: based on ISO 14577, a diamond quadrangular pyramid having an interfacial angle of 136°
Force of Indentation: 5 mN In this test, the indentation hardness HIV was obtained, and it was converted to the Vickers hardness HV in accordance with ISO-14577-1.

The micro Vickers hardness of the cover glass of Example 1 was determined in the following way. The antireflection film was formed in the same conditions as those in Example 1 except for using a Si wafer as a substrate. This sample was submitted to the above measurement, and the micro Vickers hardness was determined. This value was taken as the hardness of the cover glass of Example 1. In the other examples, the cover glass hardness was determined in the same manner as described in Example 1.

The hardness of the cover glass can be improved by the present invention. The reason was analyzed by monolayer film determination of each layer of the antireflection film.

Figure 4:
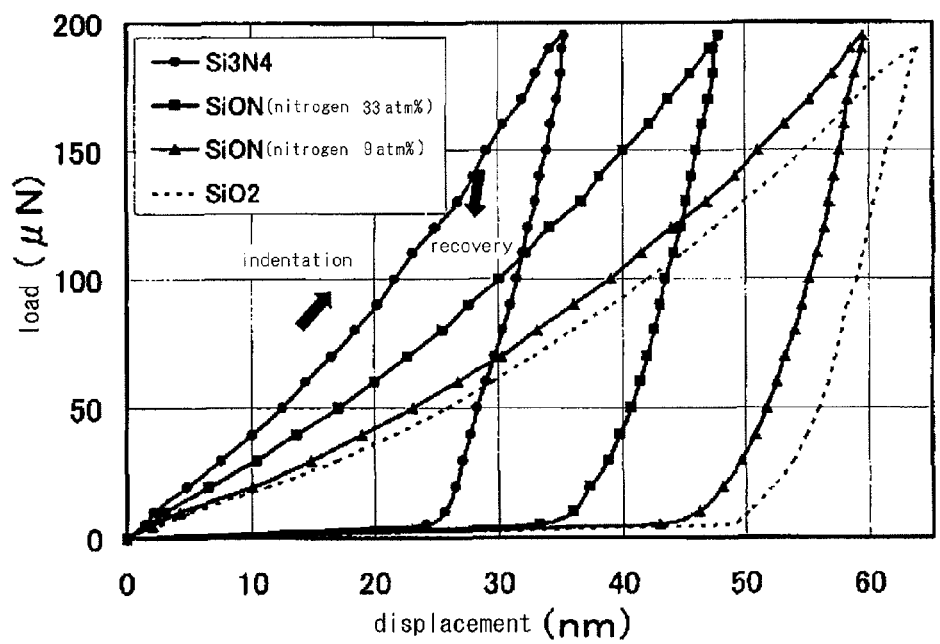
FIG. 4 is a view showing the results of measuring the hardness on a film material used in a watch cover glass of the present invention and $SiO_2$ used in a watch cover glass used in a conventional art by a nano-indenter.
Figure 5:
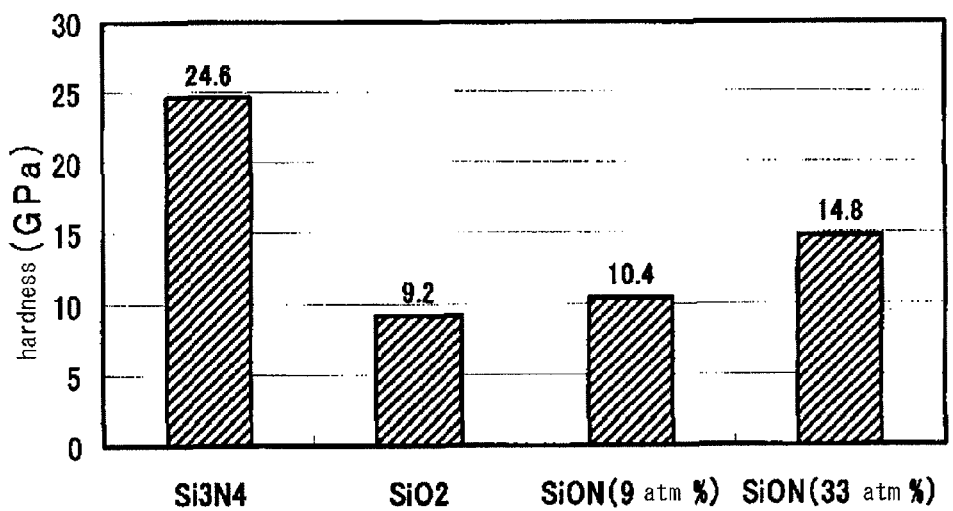
FIG. 5 is a view showing the measuring results of FIG. 4 in terms of hardness.

FIG. 4 shows the results of measuring the hardness of the monolayer film surface on $Si_3N_4$, SiON (nitrogen ratio in the film: 33%), SiON (nitrogen ratio in the film: 9%) and $SiO_2$, which had the same thickness by a nano indenter. From the left in the figure, indentation and indentation recovery loops of $Si_3N_4$, SiON (nitrogen ratio in the film: 33%), SiON (nitrogen ratio in the film: 9%) and $SiO_2$ are shown in this order. From the results, it is revealed that the hardness of each monolayer film was lowered in the above order. The samples of $Si_3N_4$ film, SiON film (nitrogen ratio in the film: 33%), SiON film (nitrogen ratio in the film: 9%) and $SiO_2$ film were produced as follows. The monolayer film of each film was formed in a thickness of about 0.5 μm on the Si wafer substrate in a prescribed gas flow ratio for a prescribed sputtering film-forming time. Subsequently, the monolayer film formed was measured by a nano indenter apparatus. (This method is used because it is known from experience that if in the sputtering, DC introducing electric power is the same, and the gas flow ratio in the film forming and the time for sputtering film-forming are constant, the rate of forming the same compound layer (rate of depositing on the substrate) is almost uniform all the time.) These results were graphed as shown in FIG. 5. It is clear that the film hardness of each monolayer film satisfies $Si_3N_4$>SiON (nitrogen ratio in the film: 33%) >SiON (nitrogen ratio in the film: 9%)>$SiO_2$.

In order to structurally analyze the above hardness in each monolayer, the film density was measured by XRD (X ray reflection analysis). As a result, the film density of $Si_3N_4$ was 3.04 g/cm$^3$, the film density of SiON (nitrogen ratio in the film: 33%) was 2.81 g/cm$^3$, the film density of SiON (nitrogen ratio in the film: 9%) was 2.56 g/cm$^3$, the film density of $SiO_2$ was 2.51 g/cm$^3$ and the film density of Si was 2.33 g/cm$^3$. As the nitrogen ratio in the film is increased, that is to say, as the nitrogen flow ratio in the film forming is increased, the film density is increased.

With respect to the monolayer of the SiON film (nitrogen ratio in the film: 9%) and the monolayer of the SiON film (nitrogen ratio in the film: 33%), the actual element percentage in the film including the depth direction was analyzed. The results are shown in FIG. 6 and FIGS. 7 (*a*) and (*b*).

Figure 6:
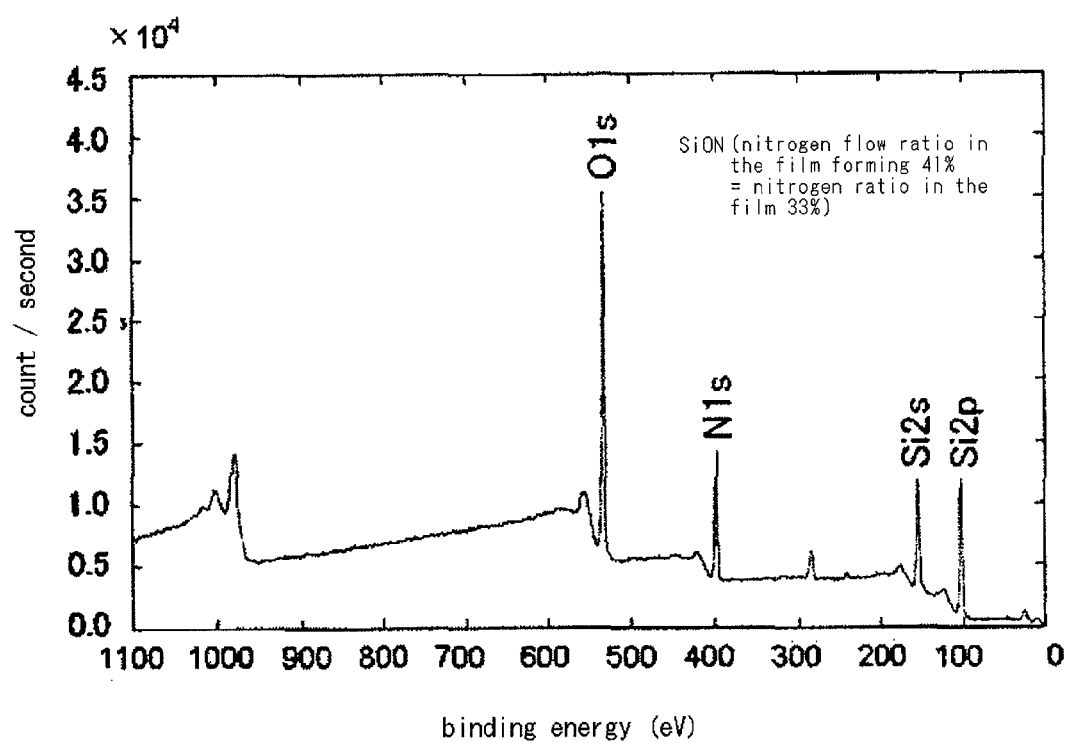
FIG. 6 is a view of the XPS analysis results on a SiON material according to the present invention.

FIG. 6 shows O1s and N1s orbital photoelectron spectrums of the SiON film (nitrogen ratio in the film: 33%) by XPS. As described above, it was confirmed that the SiON film of the present invention is not a film obtainable by merely taking nitrogen atom in $SiO_2$ but a mixed film in a $SiO_2$ and $Si_3N_4$ mixed state.

Figure 7:
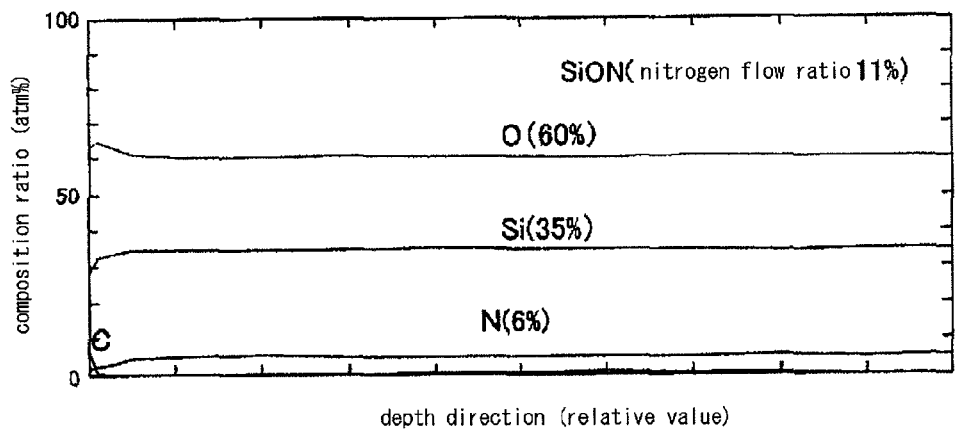
FIG. 7 is a view of the XPS analysis results on a SiON material in a depth direction according to the present invention.
Figure 7:
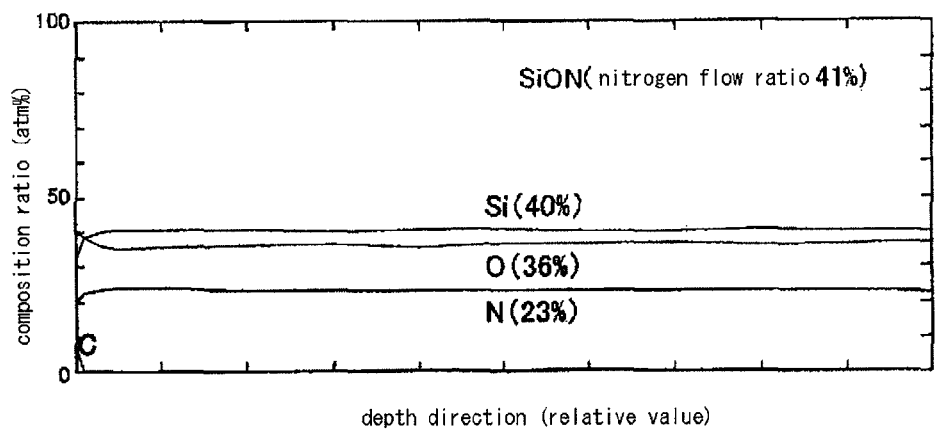

FIG. 7 (*a*) shows an atom composition ratio in the SiON film (nitrogen ratio in the film: 9%) in the thickness (depth) direction by XPS. The monolayer film formed had a silicon, oxygen and nitrogen atomic ratio of 35:60:6. The total is not 100 because there are a little of errors in the measurement. From the results, it was confirmed that when the flow ratio of oxygen to nitrogen in the film forming is 89:11, the film has an atomic ratio of oxygen to nitrogen of 60:6. The nitrogen ratio in the film is 9% per the nitrogen flow rate of 11% in the film forming.

FIG. 7 (b) shows an atom composition ratio in the SiON film (nitrogen ratio in the film: 33%) in the thickness (depth) direction by XPS. The monolayer formed had a silicon, oxygen and nitrogen atomic ratio of 36:40:23. The total is not 100 because there are a little of errors in the measurement. From the results, it was confirmed that when the flow ratio of oxygen to nitrogen in the film forming is 59:41, the film has an atomic ratio of oxygen to nitrogen of 40:23. The nitrogen ratio in the film is 36% per the nitrogen flow rate of 41% in the film forming.

Moreover, the refractive index of each monolayer film to light in a wavelength of 550 nm was measured by Ellipsometer. The refractive index of $Si_3N_4$ was 2.0, that of SiON (nitrogen ratio in the film: 33%) was 1.67, that of SiON (nitrogen ratio in the film: 9%) was 1.52, that of $SiO_2$ was 1.48. From the results, it was confirmed that as the nitrogen content in the film is higher, the refractive index is higher. This result is valid theoretically.

As described above, the SiON film having a higher nitrogen atomic ratio has a higher film hardness and a higher refractive index as compared with a film having a lower nitrogen atomic ratio. Therefore, in the range of the nitrogen content as described in Patent document 2, the favorable improvement of film hardness cannot be attained.

Thus, according to the structure of the antireflection film (from the substrate to the outermost layer, the mixed film and $Si_3N_4$ film are laminated alternately one after another in this order in the total of 5 layers and the outermost layer is the mixed film) in the present example, the high hardness can be obtained.

From the refractive index measuring results, in the range of the nitrogen content as described in Patent document 2, the multi-layered antireflection film needs to have very many layers (about 20 or more layers) in total. This fact indicates that an error in thickness is necessary to be extremely decreased in the antireflection film forming. The decrease of error is a very important problem together with a cost problem in the production. However, the cover glass of the present invention does not have these problems.

[Abrasion Resistance]

With respect to abrasion resistance (sliding resistance), which is one problem of cover glasses obtainable by conventional techniques, the evaluation test (for the front surface side) was carried out. The cover glass coated with the antireflection film in the suitable example of the present invention was allowed to contact with a lapping film on which alumina particles having a particle diameter of 10 μm were dispersed, at a contacting load of 500 g, and then the film was moved back and forth several times on the surface of the cover glass until the cover glass was flawed. The moved number of the film at the first time it was flawed was used for evaluation in the sliding and abrasion test. In this test, when flaws are not caused by moving back and forth 100 or more times in the cover glass, the cover glass is acceptable. When flaws are caused by moving back and forth less than 100 times, the cover glass is unacceptable. When flaws are not caused by moving back and forth 100 or more times in the cover glass, the hardness and the abrasion resistance are sufficient in practical use, and after using the cover glass for a long period of time, flaws or peelings are hardly caused. The present inventors confirmed them from their longitudinal experience.

The cover glass in the suitable example of the present invention was submitted to the abrasion test. The result on the abrasion resistance was acceptable, and after the moving back and forth 100 times, flaws and cloud were not caused all. These results were confirmed by a binocular microscope at 40 times.

On the other hand, the abrasion resistance of a conventional cover glass was unacceptable, and after moving back and forth 60 times, flaws were caused firstly. These results were confirmed by a binocular microscope at 40 times. After moving back and forth 90 times, cloud was confirmed by visual observation. In the sliding and abrasion test in Patent document 2, occurrence of flaws was confirmed by visual observation.

As described above, it was confirmed that the cover glass of the present invention is more excellent also in abrasion resistance as compared with those obtainable by conventional techniques.

[Weather Resistance]

In order to examine light resistance, the sunshine weather test was carried out and in order to examine heat resistance and moisture resistance, the pressure cooker test was carried out.

(Sunshine Weather Test)

Figure 11:
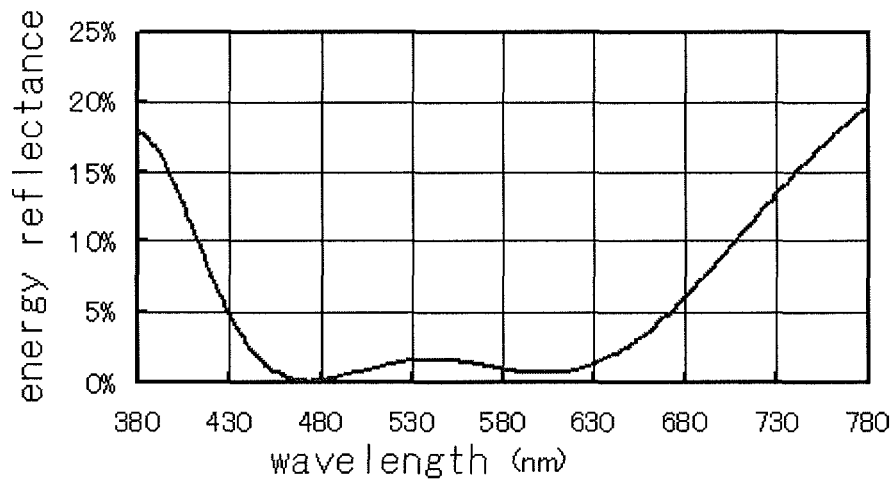
FIG. 11 are spectrum views of a reflectance property of the watch cover glass before and after a sunshine-weathering test.
Figure 11:
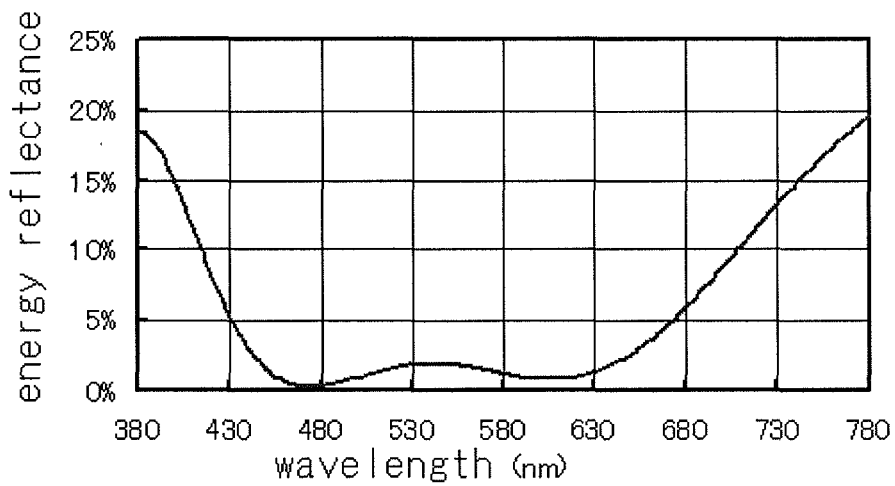

A carbon arc lamp type sunshine weather test was carried out in accordance with JIS B 7753. Specifically, the watch cover glass in Example 1 was exposed to light for 100 hr. After the test, the reflectance of the watch cover glass was measured. With regard to the watch cover glass after and before the test, the reflectance measuring results are shown in FIG. 11. In FIG. 11, the results before the test are shown (a) and the results after the test are shown in (b).

From the reflectance measuring results, it was confirmed that the watch cover glass in Example 1 has excellent light resistance.

After the test, the watch cover glass has an average reflectance of 1.6% and any change caused by the test was hardly observed.

(Pressure Cooker Test)

Figure 12:
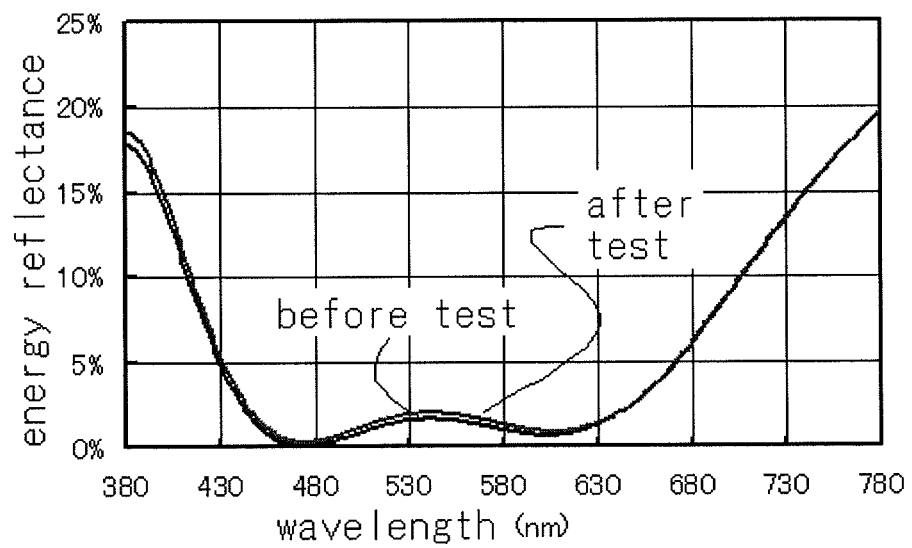
FIG. 12 is a spectrum view of a reflectance property of the watch cover glass before and after a pressure cooker test.

The pressure cooker test was carried out in accordance with ICE-68-2-66 standard in the following conditions by a testing machine manufactured by Espec Co., Ltd. Specifically, the watch cover glass in Example 1 was put in the testing machine and was tested by increasing the temperature and employing an unsaturation controlling method that moisture condensation was not caused due to temperature increasing in the test piece. The test piece was held at +110° C., 0.12 MPa (about 1.2 Kgf/cm$^2$) for 60 min. After completion of the test, the test piece was taken out from the testing machine and immediately (within 5 min) the reflectance thereof was measured. With regard to the watch cover glass after and before the test, the reflectance measuring results are shown in FIG. 12.

After the test, the overall reflection spectrum was slightly shifted to the long wavelength side. It is considered that this shift is caused by adsorbing water molecules to fine defects a slightly present in the multilayered antireflection film. After the test, the average reflectance of the watch cover glass was 1.7% and the change due to the test was very small.

The watch cover glass after the test was heated at 100° C. for 60 min and then the reflectance thereof was measured. The measurement results were in agreement with the measurement results of the watch cover glass before the test. It is considered that this agreement is caused by removing vapor molecules adsorbed on the multilayer film with heating.

In the proper example of the present invention, the antireflection film was formed on each of the front and back surfaces of the transparent substrate in order that the cover glass was designed to be in a level of very excellent reflection and light transmission properties. As a result, the very excellent reflection and light transmission properties were attained as shown in FIG. 3. However, when the reflection and light transmission properties of the cover glass are not required so much, sometimes the antireflection film may be formed on the front surface or the back surface of the transparent substrate. Next, examples of the above cover glass are described.

Example 2

Example 2 of the present invention is described with reference to FIG. 8 hereinafter. The watch cover glass of Example 2 was formed by forming an antireflection film 210 on the back surface of a sapphire glass 10 as shown in FIG. 8. The film structure of the antireflection film 210 was the same as that of the proper example of the present invention. In Example 2, on the sapphire glass, SiON (nitrogen ratio in the film: 33 atm %), $Si_3N_4$, SiON (nitrogen ratio in the film: 33 atom %), $Si_3N_4$ and SiON (nitrogen ratio in the film: 9 atom %) were laminated in this order using SiON (nitrogen ratio in the film: 33 atom %), $Si_3N_4$ and SiON (nitrogen ratio in the film: 9 atom %). The film thicknesses of the layers were 145 nm, 155 nm, 20 nm, 100 nm and 80 nm in this laminated order. The refractive index of $Si_3N_4$ was 2.00. Although the refractive index of the SiON film can be also finely regulated by the sputtering conditions, the refractive index of the SiON (nitrogen ratio in the film: 33 atom %) was 1.67 and the refractive index of SiON (nitrogen ratio in the film: 9 atom %) was 1.52. These refractive index values were determined to light in a wavelength of 550 nm by Ellipsometer.

The measurements for the nitrogen content, film thickness and refractive index were carried out in the same manners as described in Example 1.

The DC reactive sputtering apparatus, which was used for the process of producing the antireflection film in Example 2, was the same as described in Example 1. The film conditions were also the same as described in Example 1.

As described above, the watch cover glass having the antireflection film composed of SiON and $Si_3N_4$ layers laminated on the back surface of the sapphire glass 10 as shown in Fig. was accomplished by Example 2 of the present invention.

[Antireflection Function]

Figure 9:
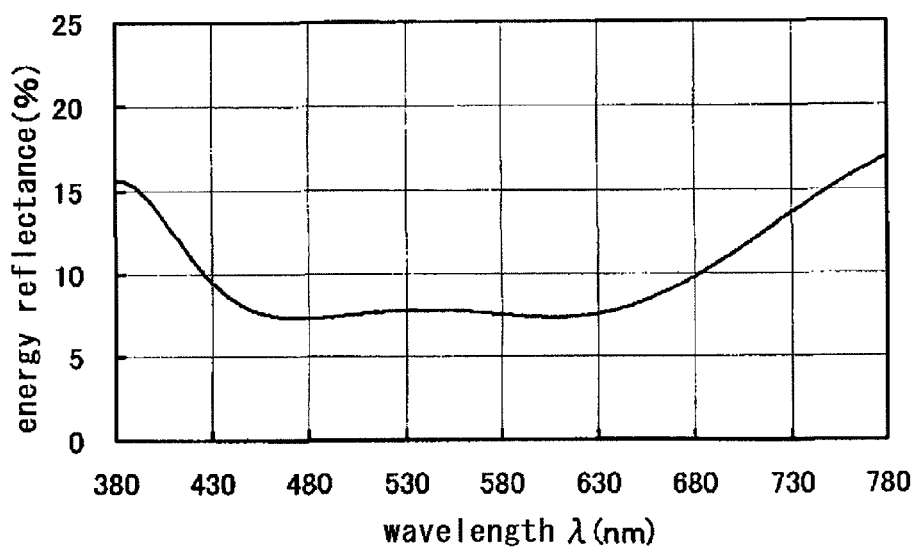
FIG. 9 is a spectrum view of a reflectance property of the watch cover glass in Example 2 of the present invention.

The results of the spectral reflection properties of the finished cover glass are shown in FIG. 9. The reflectance in a visible light wavelength of 380 nm to 780 nm was low, and the reflectance in a wavelength of 450 nm to 650 nm that has high visual sensitivity was not more than 8%. The cover glass did not have darkness in appearance caused by light absorption of the antireflection film. When the cover glass was incorporated in a watch, the dial visibility was good. As compared with a sapphire glass without an antireflection film which reflectance in the overall visible light region is about 13%, it was confirmed that the definite antireflection effect can be obtained.

The watch cover glass in Example 2 had an average reflectance of 7.4%.

[Hardness]

The front surface, which was the sapphire glass, of the cover glass in Example 2 of the present invention, had a surface hardness, namely, a micro-Vickers hardness of not less than 2600, and needless to say, it was very hard.

[Abrasion Resistance]

The abrasion resistance of the front surface of the cover glass in Example 2 of the present invention was very excellent in the abrasion test. This is a natural result because the front surface was the sapphire glass.

Example 3

Example 3 of the present invention is described without figures. The watch cover glass of Example 3 was formed by forming a 6-layered antireflection film on each of the front surface and the back surface of a sapphire glass in the same manner as described in Example 1. The film structure of the antireflection film was the same as described in the proper example. In Example 3, on the sapphire glass, $Si_3N_4$, SiON (nitrogen ratio in the film: 33 atom %), $Si_3N_4$, SiON (nitrogen ratio in the film: 33 atom %), $Si_3N_4$ and SiON (nitrogen ratio in the film: 9 atom %) were laminated in this order using $Si_3N_4$, SiON (nitrogen ratio in the film: 33 atom %) and SiON (nitrogen ratio in the film: 9 atom %). The film thicknesses of the layers were 135 nm, 72 nm, 20 nm, 40 nm, 60 nm and 85 nm in the laminated order. The refractive index of $Si_3N_4$ was 2.00. Although the refractive index of the SiON film can be finely regulated by the sputtering conditions, in Example 3, the refractive index of the SiON (nitrogen ratio in the film: 33 atom %) was 1.67 and the refractive index of SiON (nitrogen ratio in the film: 9 atom %) was 1.52. These refractive index values were determined by Ellipsometer.

The measurements for the nitrogen content, film thickness and refractive index were carried out in the same manners as described in Example 1.

The DC reactive sputtering apparatus, which was used for the process of producing the antireflection film in Example 3 was the same as described in Example 1. The film-forming conditions were also the same as described in Example 1.

As described above, the watch cover glass having the antireflection film consisting of the $Si_3N_4$ film and the SiON film laminated on each of the front surface and the back surface of the sapphire glass was accomplished.

[Antireflection Function]

The spectral reflection properties of the finished cover glass were measured. The reflectance in a visible light wavelength of 380 nm to 780 nm was low, and the reflectance in a high visual appreciation wavelength of 450 nm to 650 nm was not more than 9%. The cover glass did not have darkness in appearance caused by light absorption of the antireflection film. When the cover glass was incorporated in a watch, the dial visibility was good. It was confirmed that the definite antireflection effect can be attained as compared with that a sapphire glass without an antireflection film has a reflectance in the overall visible light region of about 13%.

The watch cover glass in Example 3 had an average reflectance of 1.9%.

[Hardness]

The front surface of the cover glass in Example 3 of the present invention had a surface hardness, namely, a micro-Vickers hardness of not less than 1200. A cover glass prepared by conventional techniques had a surface hardness (front surface side), namely, a micro Vickers hardness of not more than 850. Needless to say, the surface hardness was improved by the present invention.

[Abrasion Resistance]

The abrasion resistance of the front surface of the cover glass in Example 3 of the present invention had the result equal to that of Example 1 and was very excellent in the abrasion test.

According to the present invention, it is possible to prepare a watch cover glass having high surface hardness and excellent abrasion resistance, and also having flaw resistance and antireflection function even after using for a long period of time.

In the above examples, $N_2$ gas was used as the reaction gas containing nitrogen atom. It was confirmed by the present inventors that even using $NH_3$ gas, the same results can be also obtained. Furthermore, the 5 layered antireflection film formed on one surface is described in the example of the present invention. However, the layer number and the combination of the antireflection film can be varied and are not limited to this example. Moreover, although the antireflection films formed on the front surface and the back surface in the proper examples of the present invention have the entirely same film structure, the film structures of both surface may be different each other. The problem on the film structure is just a subject on the design. As the transparent substrate, sapphire glass was used in the examples of the present invention, but it is not a definite substrate. Soda glass, blue plate glass, white plate glass or transparent plastics may be used.

The invention claimed is:

1. A watch cover glass comprising a transparent substrate having a front surface and a back surface and, provided on at least one surface of the substrate, an antireflection film obtainable by laminating a $SiO_2$ and $Si_3N_4$ mixed film and a $Si_3N_4$ film alternately one after another in the total of 4 or more layers and having the $SiO_2$ and $Si_3N_4$ mixed film in the outermost layer,
wherein the nitrogen content of the outermost mixed film layer is lower than the nitrogen content of each inner mixed film layer.

2. The watch cover glass according to claim 1 wherein the antireflection film is obtainable by laminating the mixed film and the $Si_3N_4$ film alternately one after another in this order from the substrate toward the outermost layer.

3. The watch cover glass according to claim 1 wherein the antireflection film is obtainable by laminating the $Si_3N_4$ film and the mixed film alternately one after another in this order from the substrate toward the outermost layer.

4. The watch cover glass according to claim 1 wherein the mixed film has a nitrogen content of 5 to 90% by atom based on the total of oxygen and nitrogen.

5. The watch cover glass according to claim 1 wherein the number of the layers laminated alternately is 4 to 12 layers in the antireflection film.

6. The watch cover glass according to claim 1 wherein the mixed film has a thickness per layer of 0.01 to 1.0 μm and the $Si_3N_4$ film has a thickness per layer of 0.01 to 1.2 μm.

7. The watch cover glass according to claim 1 wherein the antireflection film has a thickness of 0.1 to 4.0 μm.

8. The watch cover glass according to claim 1 wherein the antireflection film is formed on each of the front surface and the back surface of the substrate.

9. The watch cover glass according to claim 1 wherein the antireflection film is formed by a reactive sputtering method.

10. A watch comprising said watch cover glass as claimed in claim 1.

11. A process for producing a watch cover glass comprising a transparent substrate having a front surface and a back surface and, provided on at least one surface thereof, an antireflection film, which process comprises:
an antireflection film-forming step of laminating a $SiO_2$ and $Si_3N_4$ mixed film and a $Si_3N_4$ film alternately one after another in the total of 4 or more layers by a reactive sputtering method to prepare an antireflection film having the $SiO_2$ and $Si_3N_4$-mixed film in the outermost layer,
wherein the nitrogen content of the outermost mixed film layer is lower than the nitrogen content of each inner mixed film layer.

12. The process for producing a watch cover glass according to claim 11 wherein the antireflection film is obtainable by laminating the mixed film and the $Si_3N_4$ film alternately one after another in this order from the substrate toward the outermost layer.

13. The process for producing a watch cover glass according to claim 11 wherein the antireflection film is obtainable by laminating the $Si_3N_4$ film and the mixed film alternately one after another in this order from the substrate toward the outermost layer.

14. The process for producing a watch cover glass according to claim 11 wherein the reactive sputtering method is conducted in the presence of a mixed gas comprising at least a nitrogen-containing gas and an inert gas using a Si target as a raw material by DC pulse discharge.

15. The process for producing a watch cover glass according to claim 11 wherein the mixed film has a nitrogen content of 5 to 90% by atom based on the total of oxygen and nitrogen.

16. The process for producing a watch cover glass according to claim 11 wherein the number of the layers laminated alternately is 4 to 12 layers in the antireflection film.

17. The process for producing a watch cover glass according to claim 12 wherein the mixed film has a thickness per layer of 0.01 to 1.0 μm and the $Si_3N_4$ film has a thickness per layer of 0.01 to 1.2 μm.

18. The process for producing a watch cover glass according to claim 12 wherein the antireflection film has a thickness of 0.1 to 4.0 μm.

19. The process for producing a watch cover glass according to claim 12 wherein the antireflection film is formed on each of the front surface and the back surface of the substrate.

* * * * *